US 6,550,721 B2

(12) United States Patent
Williams et al.

(10) Patent No.: US 6,550,721 B2
(45) Date of Patent: Apr. 22, 2003

(54) SAFING MODE FOR HIGH MOMENTUM STATES IN BODY STABILIZED SPACECRAFT

(75) Inventors: Paul Williams, San Pedro, CA (US); Steve Franklin, Canyon Country, CA (US); Pat Cazeau, Ladera Heights, CA (US); Grant Wang, Culver City, CA (US); Wendy Wang, Torrance, CA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 09/802,391

(22) Filed: Mar. 9, 2001

(65) Prior Publication Data
US 2002/0003193 A1 Jan. 10, 2002

Related U.S. Application Data
(60) Provisional application No. 60/188,126, filed on Mar. 9, 2000.

(51) Int. Cl.$^7$ .............................. B64G 1/10; B64G 1/24
(52) U.S. Cl. ........................................ 244/165; 244/164
(58) Field of Search ............................... 244/165, 158 R, 244/159, 164, 172

(56) References Cited

U.S. PATENT DOCUMENTS

| | | | | |
|---|---|---|---|---|
| 4,071,211 A | * | 1/1978 | Muhlfelder et al. | 244/165 |
| 4,306,692 A | * | 12/1981 | Kaplan et al. | 244/165 |
| 5,248,118 A | * | 9/1993 | Cohen et al. | 244/164 |
| 5,255,879 A | * | 10/1993 | Yocum et al. | 244/164 |
| 5,279,483 A | * | 1/1994 | Blancke et al. | 244/165 |
| 5,433,402 A | * | 7/1995 | Surauer et al. | 244/164 |
| 5,441,222 A | * | 8/1995 | Rosen | 244/165 |
| 5,556,058 A | * | 9/1996 | Bender | 244/164 |
| 5,931,421 A | * | 8/1999 | Surauer et al. | 244/165 |
| 6,089,508 A | * | 7/2000 | Noyola et al. | 244/165 |
| 6,138,953 A | * | 10/2000 | Noyola et al. | 244/165 |
| 6,152,403 A | * | 11/2000 | Fowell et al. | 244/165 |
| 6,234,427 B1 | * | 5/2001 | Decker | 244/158 R |
| 6,293,501 B1 | * | 9/2001 | Kurland | 244/164 |
| 6,311,931 B1 | * | 11/2001 | Smay | 244/164 |
| 6,340,137 B1 | * | 1/2002 | Davis et al. | 244/164 |

* cited by examiner

Primary Examiner—Charles T. Jordan
Assistant Examiner—Stephen A Holzen
(74) Attorney, Agent, or Firm—Terje Gudmestad

(57) ABSTRACT

A spacecraft with a reaction wheel system can be autonomously safed by setting the solar wings to continuous tracking, determining a slew rate vector based on the total angular momentum, and slewing the spacecraft using the slew rate vector until commanded to stop autonomous safing. When the total angular momentum of the spacecraft to large to be handled by rotisserie, then the spacecraft is reoriented to align a suitable rotation vector with the system momentum. In a typical application, the spacecraft has a reaction wheel assembly with four wheels arranged to form a right regular pyramid. Two reaction wheels on opposite edges of the pyramid form a first pair and the two remaining reaction wheels forming a second pair. The slew axis of rotation is found by determining as a selected pair the first pair if either reaction wheel in the second pair is inoperative, otherwise determining as the selected pair the second pair and determining as the slew axis of rotation the normalized projection of the axes of rotation of the selected pair onto the base. The slew direction is determined by the sign of the total angular momentum component along the slew axis of rotation.

3 Claims, 2 Drawing Sheets

SAFING MODE FOR HIGH MOMENTUM STATES IN BODY STABILIZED SPACECRAFT

RELATED APPLICATIONS

This application claims the benefit of earlier filed provisional patent application Ser. No. 60/188,126 filed on Mar. 9, 2000, entitled "Safing Mode For High Momentum States In Body Stabilized Spacecraft."

TECHNICAL FIELD

The present invention relates generally to satellite momentum storage devices, and more particularly, to a safing mode for high momentum states in body stabilized spacecraft.

BACKGROUND ART

Throughout the life of a spacecraft, attitude modifications are made to carry out mission objectives, to determine orientation, and to correct for undesired torque. In order to minimize expendable fuel in slewing maneuvers, reaction wheel systems are used to transfer rotational momentum to and from the satellite body.

When a fully deployed 3 axis controlled spacecraft accumulates angular momentum beyond the control system's ability to maintain pointing, prompt action is necessary to ensure that the spacecraft will survive. The ability of satellites with ion propulsion to quickly accumulate angular momentum is limited. However, the ability of satellites with chemical propulsion systems to quickly accumulate angular momentum is a real danger. In the presence of this danger it is critical to devise a method of autonomous spacecraft safing that can control a spacecraft while maintaining power and thermal survivability.

Prior art methods do not have the ability to autonomously safe a spacecraft in the presence of large angular momentum. Some prior art methods must store large amounts of angular momentum diurnally and also use a chemical propulsion system. In many prior art Fault Hold modes, the spacecraft body was commanded to rotate continuously about an axis transverse to the solar wing axis. This rotation is termed "rotisserie". This rotation is done using a reaction wheel array for the actuators, and gyros for the sensors. The solar wings then rotate about the solar wing drive axis to point at the sun. Solar wing drive motors are used as actuators, and wing current sensors as the sensors. The body slew direction and sign are chosen to take the best advantage of the wheel array capability, and to use the system momentum to advantage. However, for certain system momentum directions and magnitudes, the desired slew could not be maintained, due to reaction wheel saturation.

Additionally, in many cases, the prior art methods are incapable of producing stable rotation about a desired axis when the total system momentum is greater than or equal to the storage capability of the momentum storage/exchange devices. In some cases, the prior art is capable of spinning a body about a desired axis, but does not account for power survival, low momentum survival and minimum spin speed requirements.

The disadvantages associated with these conventional satellite safing techniques have made it apparent that a new technique for satellite safing is needed. The new technique should allow autonomous spacecraft safing that can control a spacecraft while maintaining power and thermal survivability. Additionally, the new technology should allow autonomous spacecraft safing in the presence of large system angular momentum that has a much larger momentum envelope than previous methods. The present invention is directed to these ends.

SUMMARY OF THE INVENTION

It is, therefore, an object of this invention to provide an improved and reliable safing mode for high momentum states in body stabilized spacecraft. Another object of the invention is to allow autonomous spacecraft safing that can control a spacecraft while maintaining power and thermal survivability. An additional object of the invention is to allow autonomous spacecraft safing in the presence of large system angular momentum that has a much larger momentum envelope than previous methods.

In accordance with the objects of this invention, a safing mode for high momentum states in body stabilized spacecraft system is provided. In one embodiment of the invention, a spacecraft with a reaction wheel system can be autonomously safed by setting the solar wings to continuous tracking, determining a slew rate vector based on the total angular momentum, and slewing the spacecraft using the slew rate vector until commanded to stop autonomous safing. When the total angular momentum of the spacecraft is to large to be handled by rotisserie, then the spacecraft is reoriented to align a suitable rotation vector with the system momentum. In a typical application, the spacecraft has a reaction wheel assembly with four wheels arranged to form a right regular pyramid. Two reaction wheels on opposite edges of the pyramid form a first pair and the two remaining reaction wheels forming a second pair. The slew axis of rotation is found by determining as a selected pair the first pair if either reaction wheel in the second pair is inoperative, otherwise determining as the selected pair the second pair and determining as the slew axis of rotation the normalized projection of the axes of rotation of the selected pair onto the base. The slew direction is determined by the sign of the total angular momentum component along the slew axis of rotation.

The present invention thus achieves an improved safing mode for high momentum states in body stabilized spacecraft. The present invention is advantageous in that it is capable of producing stable rotation about a desired axis when the total system momentum is greater than or equal to the storage capability of the momentum storage devices while accounting for power and low momentum survival and minimum spin requirements.

Additional advantages and features of the present invention will become apparent from the description that follows and may be realized by means of the instrumentalities and combinations particularly pointed out in the appended claims taken in conjunction with the accompanying drawings.

BRIEF DESCRIPTION OF THE DRAWINGS

In order that the invention may be well understood, there will now be described some embodiments thereof taken by way of example, reference being made to the accompanying drawings in which.

BEST MODES FOR CARRYING OUT THE INVENTION

Figure 1:
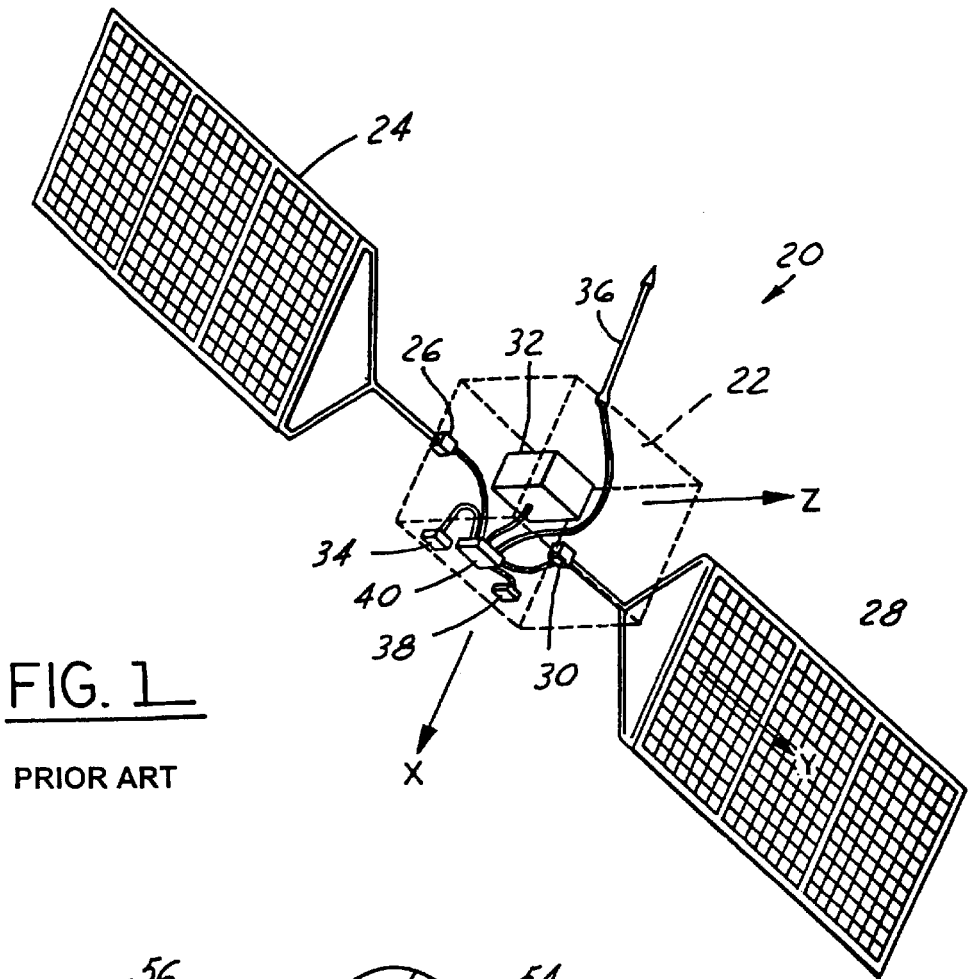
FIG. 1 is a perspective view of a satellite system having a safing mode for high momentum states in body stabilized spacecraft in accordance with one embodiment of the present invention.

In the following Figures, the same reference numerals will be used to identify identical components of the various views. The present invention is illustrated with respect to a safing mode for high momentum states in body stabilized spacecraft particularly suited for the aerospace field. However, the present invention is applicable to various and other uses that may require safing mode for high momentum states.

Referring now to FIG. 1, a graphical representation of a spacecraft for using the present invention is shown. A spacecraft, shown generally as 20, has a body 22. An orthonormal body frame is indicated by the x or roll axis, y or pitch axis, and z or yaw axis.

North solar wing 24 is rotatively attached to the north or −y face of body 22 through north solar wing drive 26. North solar wing drive 26 is operative to rotate north solar wing 24 relative to body 22. South solar wing 28 is rotatively attached to the south or +y face of body 22 through south solar wing drive 30. South solar wing drive 30 is operative to rotate south solar wing 26 relative to body 22. Solar cells, also not shown, may be coupled so as to rotate with both wings.

Spacecraft 20 includes reaction wheel system 32 to exchange rotational momentum between the wheels and body 22 so as to modify the attitude of spacecraft 20. A typical reaction wheel system is described with regards to FIG. 2 below. Spacecraft 20 may also include thrusters, not shown for clarity, to drive attitude and position changes.

In one embodiment, sun sensor 34 is attached to the positive x face of spacecraft body 22, and may be a wide field of view sun sensor array (SSA). In another embodiment, sun position is obtained by slewing solar wings 24 and 28 until a maximum current is obtained from the solar cells. The position of wings 24 and 28 relative to body 22 indicate a projection of the sun vector onto the roll-yaw plane.

Spacecraft 20 may also include an antenna 36 for T&C communication with a ground station not shown. A set of three-axis gyroscopes 38 senses changes in attitude. Control logic 40, in communication with north solar wing drive 26, south solar wing drive 30, reaction wheel system 32, sun sensor 34, antenna 36, and gyroscopes 38, accepts input from sensors and produces signals to actuators so as to accomplish the present invention.

Figure 2:
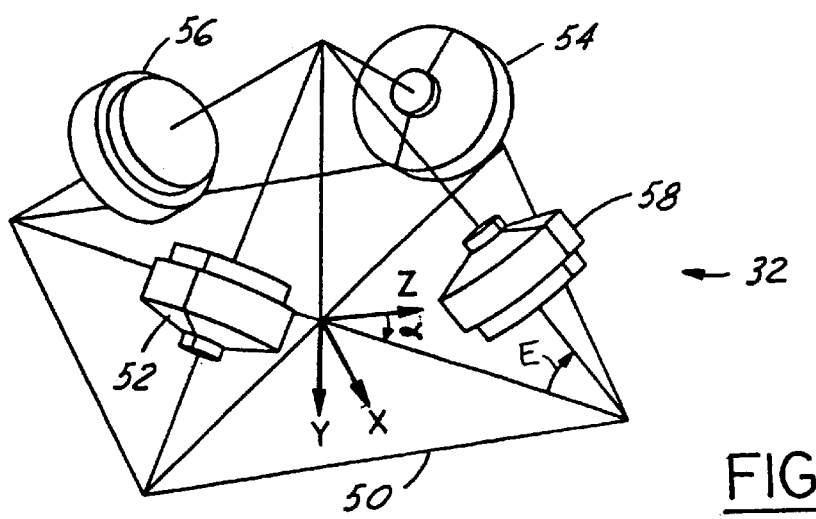
FIG. 2 is a graphical representation of a reaction wheel array pyramid that may be used by the method according to the present invention.

Referring now to FIG. 2, a graphical representation of a reaction wheel array pyramid that may be used by the method according to the present invention is shown. Reaction wheel system 32 includes reaction wheel array 50. One skilled in the art would realize that system 32 may be any type of momentum storage device. In a preferred embodiment, reaction wheel array 50 includes reaction wheel one (RW1) 52, reaction wheel two (RW2) 54, reaction wheel three (RW3) 56, and reaction wheel four (RW4) 58. In one implementation, the reaction wheels are arranged such that the axes of rotation form the slant edges of a right regular pyramid. The base of the pyramid lies in the x-z plane. The base is rotated an angle Δ typically 45 degrees, from the z-axis. The altitude, or height, of the pyramid is parallel to the y-axis. The angle of elevation, E, determines the height of the pyramid. In as illustrative example, E is 45 degrees.

Each wheel in reaction wheel array 50 may be spun in either direction, independently of other wheels, up to a maximum velocity. The maximum velocity determines the saturation momentum for the wheel. The vector sum of moments stored in all wheels represents the total momentum stored in reaction wheel array 50.

Figure 3:
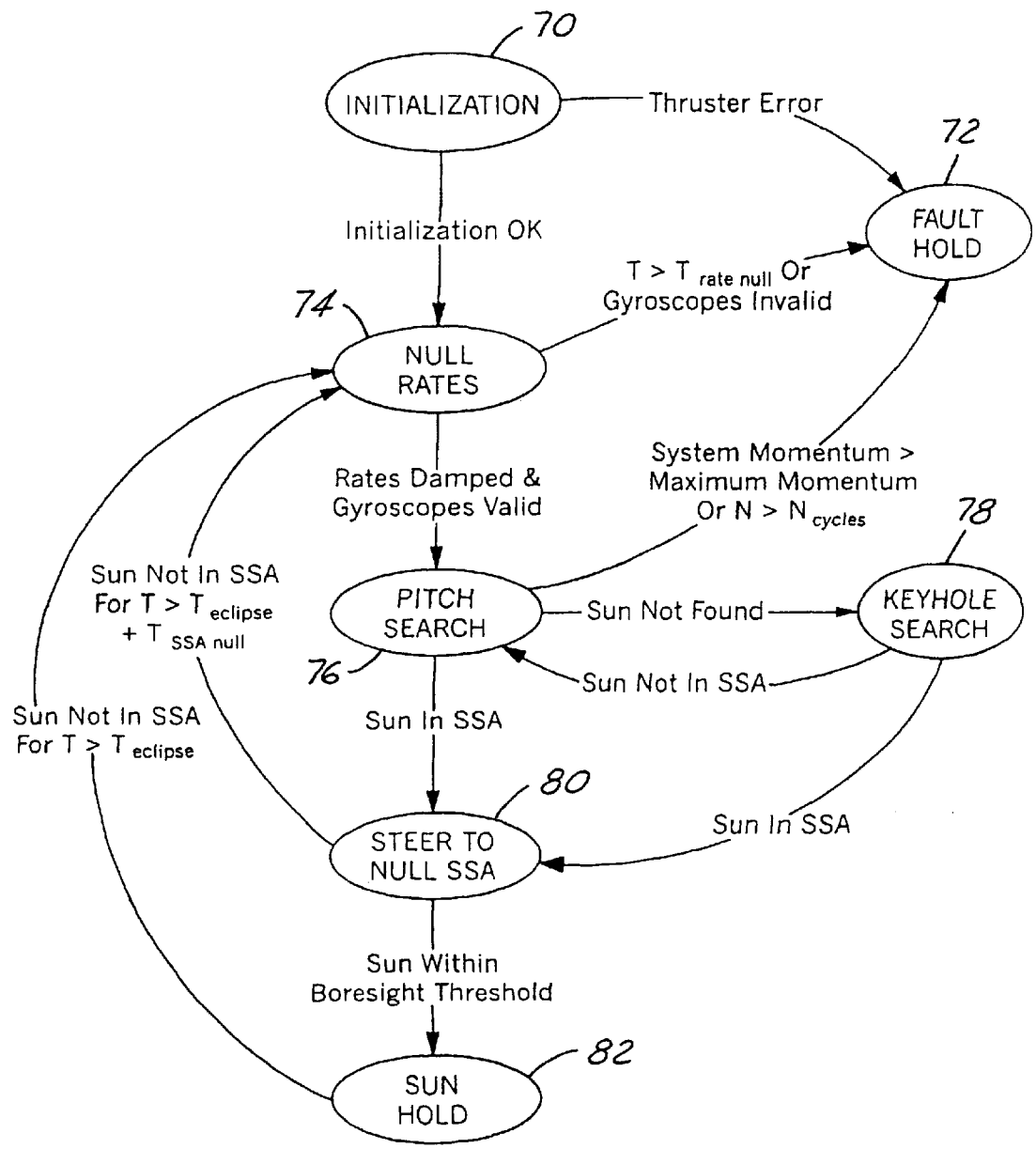
FIG. 3 is a state diagram showing a common sun acquisition sequence that may initiate the method of the present invention.

Referring now to FIG. 3, a state diagram showing a common sun acquisition sequence that may initiate the method of the present invention is shown. Spacecraft 20 may be commanded to acquire a sun-pointing attitude. Initialization state 70 is used to set steering to inertial and initialize the sequence. During initialization faults may occur such as, for example, receiving sensor indications that a thruster valve is closed after a command to enable thrusters. In this case, fault hold state 72 is entered. If initialization is successful, rates are nulled.

Null rates state 74 is used to null residual rates, initiate solar wings 24,28 sun search, and monitor the validity of gyroscopes 38. If a time greater than the null rate time $T_{rate\ null}$ is required or if gyroscopes 38 produce invalid readings, fault hold state 72 is entered. If rates are damped within $T_{rate\ null}$ and gyroscopes are operating properly, a pitch search is initiated.

Pitch search state 76 is used to slew spacecraft 20 about the pitch axis. If the sun is not found by sun sensor 34, the sun is assumed to be roughly aligned with the y-axis, in which case a keyhole search is performed. If the sun is located by sun sensor 34, the position of the sun within the x-z plane has been determined and spacecraft 20 is steered to center the sun in the SSA. If the momentum of spacecraft 20 exceeds the maximum momentum allowed by reaction wheel system 32, fault hold state 72 is entered. Fault hold state 72 is also entered if the number of cycles between pitch search and keyhole search exceeds a constant $N_{cycles}$.

Keyhole search state 78 is used to perform a keyhole search. Spacecraft 20 is rated about an axis perpendicular to the pitch axis an angle between 15 and 90 degrees to move the sun off the pitch axis. If the sun appears in sun sensor 34 while performing the keyhole search, the spacecraft is steered to center the sun in sun sensor 34. If not, a pitch search is performed. Steer to null SSA state 80 is used to slew spacecraft 20 about an axis substantially in the x-z plane in order to bring the sun within the boresight of sun sensor 34 and rates are nulled. If successful, sun hold state 82 is entered. If acquisition is not accomplished within a set time period, null rates state 74 is entered. The time allowed is the sum of the eclipse time, $T_{eclipse}$, which allows for time during which the sun is blocked by a celestial body such as the earth, and the time required to perform the x-z axis slew, $T_{SSA\ null}$.

Sun hold state 82 holds the sun in sun sensor 34. If the sun is not in view for a length of time greater than $T_{eclipse}$ null rates 74 state is entered.

Fault hold state 72 is entered if a fault condition occurs during sun acquisition. While in fault hold, spacecraft 20 must maintain power safe and T&C coverage while waiting for ground commands. The present invention provides a method and system for choosing the slew axis and direction for a continuously commanded rate so that maximum momentum in reaction wheel system 32 can be applied. Spacecraft 20 is rotated regardless of the relative solar position in order to maintain T&C coverage and to get power from solar wings 24,28. Since solar wings 24,28 are along the body pitch axis, spacecraft 20 is rotated about an axis transverse to the y axis so that currents can be generated on solar wings 24,28 periodically even if the sun is Initially along the y axis. Even with periodic saturation of reaction wheel system 32 keeping spacecraft 20 from achieving the desired rate, periodic solar power from wings 24,28 is assured.

Upon entering fault hold 72, the logic makes an initial determination of whether to use a "rotisserie" mode or a "WGWANC" mode. If the momentum changes while the satellite is in Fault hold, the logic may switch from WGWANC to Rotisserie, or vice versa.

While WGWANC and Rotisserie are used to control the spacecraft body, the spacecraft wings are put in a "Sun Search" mode where each wing's solar wing drive (SWD) motor is stepped in accordance with the measured solar wing current for that wing, in order to try to maximize the solar wing current. With the exception that the central body rate about the solar wing drive axis is fed forward to the solar wing drive, this steering is independent of the body steering. The solar wing drive rate consists of a countersteer rate to counteract the body rate about the solar wing drive axis, plus a search rate. If the wing current does not pass a presence threshold, the wing is steered at a slew rate in a fixed direction, and the slew rate is increased in steps from a minimum rate to a maximum rate if the sensed wing current does not exhibit a local maximum that is greater than a sun presence threshold. When such a maximum is detected, the search slew magnitude is decreased to the minimum search rate, and the slew rate sign is reversed. The sensed wing current is low-pass filtered to desensitize the search to noise and wing flexing.

If the spacecraft momentum is above a threshold at entry to Fault Hold, then the WGWANC processing is entered. The spacecraft will be controlled to align the spacecraft body rotation with the spacecraft angular momentum vector, by controlling the reaction wheels to null the rates transverse to the desired spin axis. However, it is useful to permit the choice of the closer of more than one acceptable spin axis, to minimize the convergence time. For example, in once case those two axes are +Z and −Z, and they are chosen by determining which lies closer to the spacecraft total angular momentum.

Note that, generally, what is desired is a body spin axis which is substantially transverse to the solar wing drive axis/axes. This is to avoid the condition where the sun lies substantially along the solar wing drive axis, which would preclude the wing sun search from being able to achieve sufficient solar power by rotating about the solar wing drive axis. A body rotation transverse to the solar wing drive axis ensures that this condition, if it occurs, is only for a fraction of the time, so that the average solar power received over a full body rotation period is sufficient for spacecraft survival, Since, in a condition like this, the wing solar power would vary approximately as a rectified sine wave, with batteries discharged at low wing current, and recharged at high wing current, it is desirable to ensure a sufficiently high body rate so that the depth of battery discharge is survivable. The body rotation also serves to help reduce spacecraft body momentum buildup due to environmental torques (solar, aerodynamic, gravity gradient, magnetic, etc), and to ensure that any momentary losses of ground command/telemetry access due to "blind spots" are only temporary.

Based on the chosen spin axis, a body control option is selected and sent to the MoDe interface (MDX) logic, which the gain select module (GSM) will read, and then act to select the appropriate WGWANC control gains. A rate command of zero in all three axes is sent to the Steering (STR) logic, since the body rates will be determined by the action of WGWANC, not STR.

A counter, $T_{switch}$, is initialized at this point. It is used later to decide when to switch to Rotisserie mode, if needed. Then, all the wheels are commanded to zero. This is in preparation for WGWANC, to place all the wheels at the center of their range, to minimize the possibility of wheel speed saturation. This has the effect of dumping all the wheel array momentum in the body.

Sending all wheels to zero speed is accomplished by putting them in "Speed Hold" mode, commanding zero speed in all four wheels and setting a timer to give them enough time to reach zero speed. (wheel speed measurement logic that determined when the wheels were sufficiently close to zero would be an alternative). The "Spd-Hld", or "Speed Hold" wheel control mode is one where each wheel speed is commanded directly, as opposed to the "Accel" mode, where each wheel is torqued in accordance with a body attitude control feedback law.

The logic stays in the 'Start WGWANC' module until the wheel speed timer times out. The "Proc:" logic is what is done during that time period (the Init code is only done once.) Note that the large body inertias of GEM make it unlikely that the direction of the system angular momentum in the body will change significantly in this time period. The spin direction was determined before wheel spindown because the measurement of momentum in the wheels is very accurate, where as the measurement of the momentum component in the body (due to dumping the wheel momentum there) is less accurate since GEM does not know its body inertias as accurately as its wheel inertias. In other applications, one might choose to pick the WGWANC slew direction after spinning the wheels down, and choose from more spin directions (e.g., +X and −X might be considered) make some other variations.

Once the wheel timer has been expired, the wheels are put back in acceleration mode, and the logic proceeds to WGWANC Module Block III. Here, to ensure a sufficiently high body rate, a commanded wheel momentum is computed to counterspin the wheel array and thus speed up the body rate. This is accomplished by adding to the regular WGWANC control torques, a wheel torque term that is proportional to the difference between the measured wheel array momentum, and the commanded wheel momentum, in all three axes. This acts like a "spring" that tends to keep the wheel-momentum close to the desired value. The proportional gains used may be different in all three axes, and may be used even if the commanded wheel momentum is zero, to help avoid wheel speed saturation.

The spacecraft momentum is now checked against a threshold to determine if the momentum is low enough to switch to rotisserie. Note that, if momentum is low, the WGWANC strategy of rotating about the system angular momentum may result in an erratic rotation direction, since environmental torques may move the momentum too much in a rotation. Hence the use of the rotisserie logic for low momentum states. To avoid needless switching, this value can be made lower than the original decision threshold set at entry to Fault Hold. In addition, logic is added which requires that the value be past that threshold for enough time. This is implemented using an incrementing/ decrementing timer that counts up when the momentum is past threshold, down otherwise, and is never allowed to go negative. If this timer goes over its own threshold, a switch is made to Rotisserie mode. This helps avoid unwarranted switching due to things like flexible wing mode momentum, wing slew momentum, etc.

The present invention thus achieves an improved and reliable safing mode for high momentum states in body stabilized spacecraft by reorienting the spacecraft to align a suitable rotation vector with the system momentum. Another object of the invention is to allow autonomous spacecraft safing that can control a spacecraft while maintaining power and thermal survivability. An additional object of the invention is to allow autonomous spacecraft safing in the presence of large system angular momentum that has a much larger momentum envelope than previous methods From the foregoing, it can be seen that there has been brought to the art a new and improved safing mode for high momentum states in body stabilized spacecraft. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims.

What is claimed is:

1. A method for autonomous safing of a spacecraft with reaction wheels, the spacecraft having at least one wing for generating power, the method comprising:

setting the at least one wing to continuous tracking;

determining a slew rate vector based on total angular momentum;

slewing the spacecraft using the slew rate vector until commanded to stop autonomous safing when said angular momentum is below a first threshold momentum of said reaction wheels;

determining when said angular momentum is above a second threshold momentum of said reaction wheels greater than said first threshold momentum of said reaction wheels;

aligning a spacecraft body rotation with the slew rate vector by controlling the reaction wheels to null rates transverse to said slew rate vector;

determining when said angular momentum is above said first threshold momentum and below said second threshold momentum; and activating counterspin wheel momentum.

2. A system for autonomous safing of a spacecraft having a body comprising:

at least one solar wing;

for each solar wing, a solar wing drive attaching the solar wing to the body, the solar wing drive operable to rotate the solar wing relative to the body;

a reaction wheel system within the body, the reaction wheel system operative to exchange angular momentum with the body; and a control logic within the body, the control logic in communication with each solar wing drive and the reaction wheel system the control logic operable to (a) set the at least one wing to continuous tracking, (b) determine a slew rate vector based on the total angular momentum, (c) slew the spacecraft using the slew rate vector until commanded to stop autonomous safing when said angular momentum is below a first threshold momentum of said reaction wheels, (d) determining when said angular momentum is above a second threshold momentum of said reaction wheels greater than said first threshold momentum of said reaction wheels; (e) align a spacecraft body rotation with the slew rate vector by controlling the reaction wheels to null rates transverse to said slew rate vector; (f) determine when said angular momentum is above said first threshold momentum and below said second threshold momentum; and (g) activate counterspin wheel momentum.

3. A method for autonomous safing of a spacecraft comprising the steps of:

providing a spacecraft comprising at least one wing for generating power and further comprising four reaction wheels, the four reaction wheels being respectively positioned along four slant edges of a pyramid having a square base;

determining when said angular momentum is above a first threshold momentum of said reaction wheels;

orienting the spacecraft using at least two of the four reaction wheels operating simultaneously to align a spacecraft body rotation with a slew rate vector by controlling the reaction wheels to null rates transverse to said slew rate vector;

determining when said angular momentum is above a second threshold momentum of said reaction wheels greater than said first threshold momentum of said reaction wheels; and aligning a spacecraft body rotation with the slew rate vector by controlling the reaction wheels to null rates transverse to said slew rate vector.

* * * * *